C. E. WARNER.
Hay-Loaders.
No. 145,321.    Patented Dec. 9, 1873.
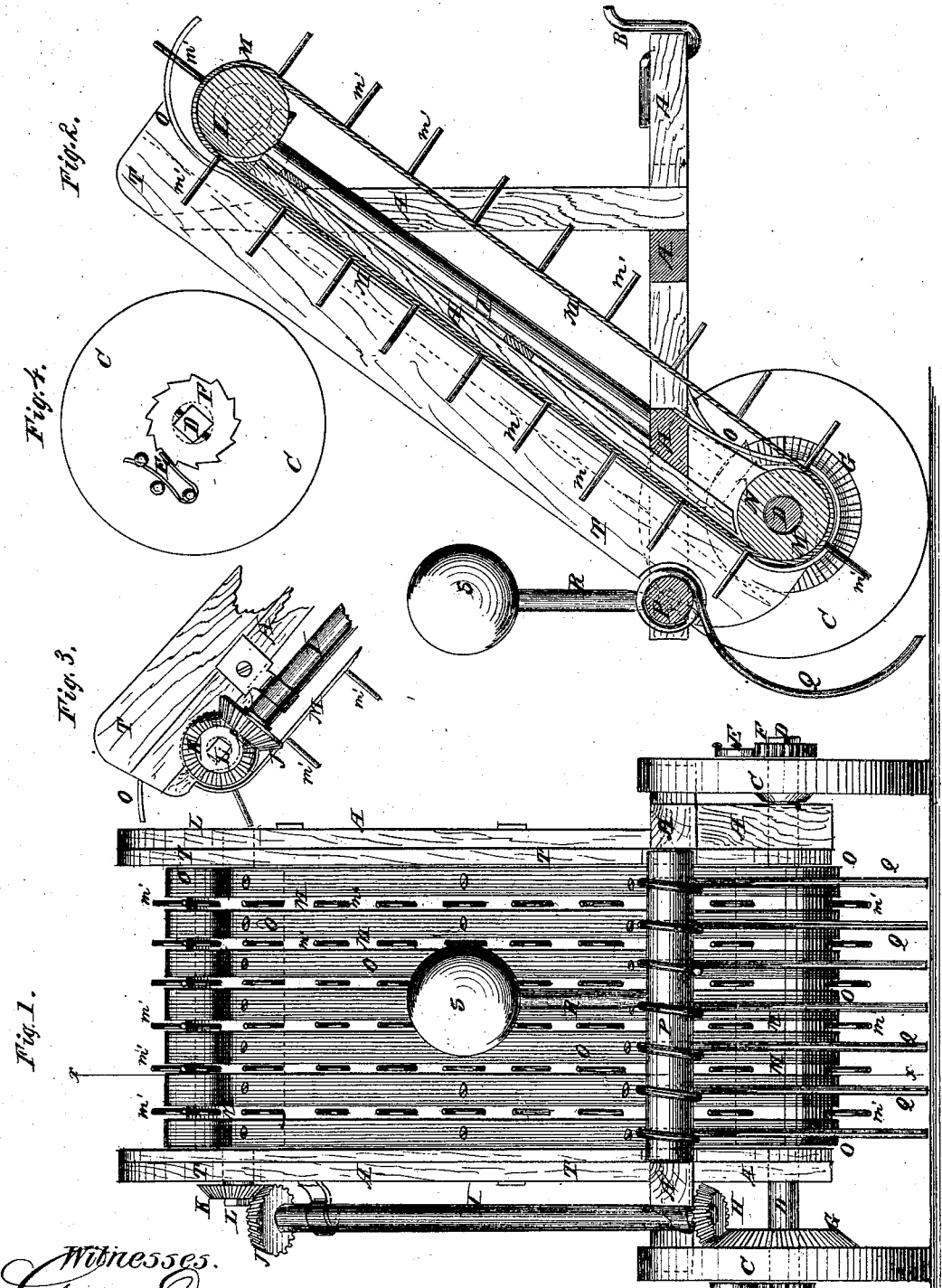

UNITED STATES PATENT OFFICE.

CHARLES E. WARNER, OF BURLINGTON, KANSAS.

IMPROVEMENT IN HAY-LOADERS.

Specification forming part of Letters Patent No. 145,321, dated December 9, 1873; application filed December 14, 1872.

*To all whom it may concern:*

Be it known that I, CHARLES E. WARNER, of Burlington, in the county of Coffey and State of Kansas, have invented a new and useful Improvement in Hay Rake and Loader, of which the following is a specification:

Figure 1 is a rear view of my improved machine in position for work. Fig. 2 is a detail vertical section of the same, taken through the line $x\,x$, Fig. 1. Fig. 3 is a detail view of a portion of the driving-gearing. Fig. 4 is a detail view of the ratchet-wheel and pawl for connecting the drive-wheel and axle.

Similar letters of reference indicate corresponding parts.

My invention has for its object to furnish an improved machine which shall be so constructed as to collect the hay, raise it, and deposit it upon a wagon, and which shall be simple in construction, convenient in use, and effective in operation; and it consists in providing the lower portion of a hay-elevator with a shaft journaled in the frame of the device, and having teeth curving over and below the carrying-wheels, the shaft being also provided with a lever, upon one end of which is a weight, the other end being constructed to fit into apertures in the shaft, these apertures being arranged at different angles, so that when the end of the lever is placed in a certain one of them the rake is elevated, and when inserted in another the rake is held in close relation to the teeth of the elevator.

A is the frame-work of the machine, to the forward end of the lower or horizontal part of which is attached a hook, B, or other convenient device for connecting the machine with the rear part of a wagon. C are the drive-wheels, which revolve upon the journals of the axle D, which revolves in bearings attached to the frame A. To the wheels C are attached pawls E, which take hold of the teeth of the ratchet-wheels F, attached to the axle D, so that the wheels C, when they turn forward, may carry the axle D with them, but may turn back freely. To the axle D, at the inner sides of the wheels C, are rigidly secured bevel-gear wheels G, into the teeth of which mesh the teeth of the bevel-gear wheels H, attached to the lower ends of the shafts I, which extend up along the side bars of the inclined part of the frame; and to their upper ends are attached bevel-gear wheels J, the teeth of which mesh into the teeth of the bevel-gear wheel K, attached to the ends of the roller L, which is pivoted to the upper end of the inclined part of the frame A. M are endless belts, which pass around the roller L, and around the roller N, that runs loosely upon the axle D. The endless belts M are provided with spikes, prongs, or teeth $m'$, which take the hay collected by the rake, carry it up, and discharge it upon the wagon. The toothed belts M $m'$, while carrying up the hay, rest upon bottom boards or a frame attached to the inclined part of the frame A. O are guards, which are attached to the bottom or frame of the carrier, and which overlap the endless belts M, only sufficient space being left between the adjacent edges of said guards O for the passage of the teeth $m'$. The lower ends of the guards O pass around the lower roller N, and are secured to the lower part of the frame A. The upper ends of the guards O are provided with a proper upward curvature or inclination, which begins a suitable distance below the vertical central plane of roller L, which curve is designed to loosen such hay as may become clogged about the teeth $m'$, in order that it may pass freely from the teeth as they begin to descend over the roller. By this curvature the said ends of the guards pass beyond the roller, and are curved downward, to guide the hay upon the wagon, and prevent it from being carried down by the teeth $m'$. P is the rake-shaft, which is pivoted to the frame A above the lower roller N, and to which are attached spring-wire teeth Q, in the ordinary manner. The teeth Q collect the hay, and are so formed as to serve as guides to keep the hay upon the teeth $m'$ of the carrier while being carried over the roller N. In the shaft P are formed holes to receive the stem R of the weight S, to hold the rake-teeth Q down to their work, and which may be adjusted to balance the rake-teeth and hold them away from the ground while passing from place to place. The machine is provided with side boards T, to keep the hay in place upon the elevator while being carried up.

Having thus described my invention, I claim as new and desire to secure by Letters Patent—

The weight S, adjustable, by holes, at different angles in the shaft, in combination with the shaft P, for the purpose of retaining the rake-teeth Q in a depressed or elevated position, substantially as shown and described.

CHARLES E. WARNER.

Witnesses:
    THOMAS S. WIRT,
    WM. H. MARRS.